(12) United States Patent
Plotkin et al.

(10) Patent No.: US 7,730,327 B2
(45) Date of Patent: Jun. 1, 2010

(54) MANAGING THE ENCRYPTION OF DATA

(75) Inventors: Serge Plotkin, San Carlos, CA (US);
Hristo Bojinov, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1084 days.

(21) Appl. No.: 11/223,445

(22) Filed: Sep. 9, 2005

(65) Prior Publication Data

US 2007/0058801 A1    Mar. 15, 2007

(51) Int. Cl.
*H04L 9/00* (2006.01)
(52) U.S. Cl. ..................................................... 713/193
(58) Field of Classification Search .................. 380/28, 380/273, 37, 42; 713/164, 165, 166, 167, 713/193
See application file for complete search history.

(56) References Cited

U.S. PATENT DOCUMENTS

| | | | | |
|---|---|---|---|---|
| 6,161,146 A * | 12/2000 | Kley et al. | .................. | 709/248 |
| 6,351,813 B1 * | 2/2002 | Mooney et al. | ............. | 713/185 |
| 6,851,056 B2 * | 2/2005 | Evans et al. | .................. | 713/193 |
| 6,993,661 B1 | 1/2006 | Garfinkel | | |
| 7,237,013 B2 * | 6/2007 | Winkeler et al. | ............ | 709/217 |
| 7,266,842 B2 * | 9/2007 | Foster et al. | ................... | 726/17 |
| 2003/0037248 A1 | 2/2003 | Launchbury et al. | | |
| 2003/0149852 A1 * | 8/2003 | Kang | .......................... | 711/164 |
| 2003/0200448 A1 * | 10/2003 | Foster et al. | ................. | 713/189 |
| 2004/0153642 A1 | 8/2004 | Plotkin et al. | | |
| 2005/0033988 A1 | 2/2005 | Chandrashekhar et al. | | |
| 2005/0041812 A1 | 2/2005 | Sundararajan et al. | | |
| 2005/0080761 A1 | 4/2005 | Sundararajan et al. | | |
| 2005/0102498 A1 | 5/2005 | Bojinov et al. | | |
| 2005/0238175 A1 | 10/2005 | Plotkin et al. | | |
| 2006/0036732 A1 * | 2/2006 | Strohwig et al. | ............ | 709/225 |

OTHER PUBLICATIONS

Decru, Inc., "Decru Datafort™ Storage Security Appliances", © 2004, 2 pages.
Decru, Inc., "Decru Datafort™ E-Series Storage Security Appliances—Transparent Data Security for Network Attached Storage (NAS)", © 2004, 2 pages.
Decru, Inc., "Decru Datafort FC-Series Storage Security Appliances—Comprehensive Security for Storage Area Networks and Tape Backup", © 2004, 2 pages.
U.S. Appl. No. 11/223,443, filed Sep. 9, 2005, Serge Plotkin.
U.S. Appl. No. 11/223,444, filed Sep. 9, 2005, Serge Plotkin.
U.S. Appl. No. 11/222,684, filed Sep. 8, 2005, Serge Plotkin.
U.S. Appl. No. 11/223,890, filed Sep. 9, 2005, Serge Plotkin.

* cited by examiner

*Primary Examiner*—Beemnet W Dada
(74) *Attorney, Agent, or Firm*—Cesari and McKenna LLP

(57) ABSTRACT

Embodiments of methods, devices and/or systems for managing the encryption of data are described.

20 Claims, 4 Drawing Sheets

MANAGING THE ENCRYPTION OF DATA

BACKGROUND

This disclosure is related to managing the encryption of data.

One difficulty with state of the art technology for encryption of data is concerning the ability to access the data, such as during an encryption process. For example, during an encryption process, access to the data may be limited and/or suspended. Additionally, if access to the data is provided during an encryption process, it may be difficult to ensure that the accessed data is encrypted.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

Figure 1:
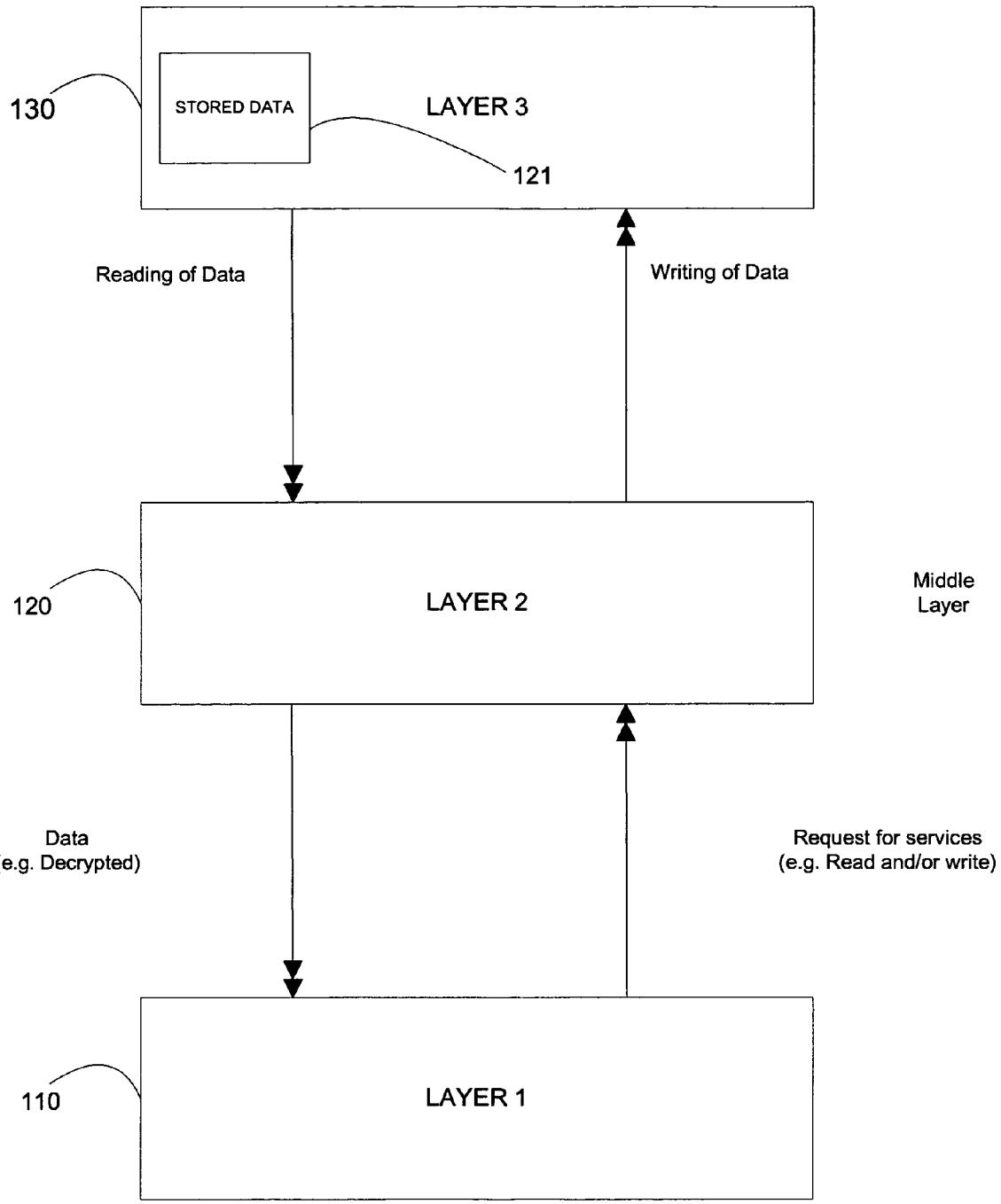
FIG. 1 is a schematic diagram illustrating an embodiment of a system that may be implemented to manage the encryption of data.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As pointed out above, one disadvantage of state of the art technology is that the capability to access data, which may include reading and/or writing data may be limited during an encryption process. The capability to read and/or write data may be limited by denying requests to access data. For example, a data storage device may be taken "off line" so that the data on the data storage device may be encrypted, and as a result a user may have no capability to read and/or write data during the encryption process. Limited access may result in downtime of a data storage device from the perspective of a user who may request access to the data and may be denied access to the data. Access to the data may be limited and/or suspended by the device and/or devices storing the data, and/or the device or devices encrypting the data. It may be desirable to provide a method and/or system to provide functionality including providing access to portions of data during an encryption process, such as by limiting access to portions of data currently being encrypted, and not limiting access to portions of data not currently being encrypted, for example.

An additional difficulty is that if the capability to read and/or write data is provided during an encryption process, it may be difficult to ensure that all the data that is intended to be encrypted is actually encrypted. For example, an encryption process may be implemented in a data storage device. The encryption process may follow a particular pattern, such as by encrypting data file by file, sector by sector and/or block by block, depending, for example, how the data may be stored. If data is read and/or written during an encryption process, one or more of the files, sectors and/or blocks, for example, may be altered, and the altered data may not be encrypted. For example, the size, structure and/or content of the data designated to be encrypted may be altered, such as by adding files, sectors or blocks, changing file structures, moving data and/or by forming or moving directories, for example. The altered data may not be encrypted in accordance with the remaining data, because, for example, a particular encryption process may follow a methodology wherein data may be encrypted file by file or block by block, and if a file is encrypted and subsequently altered by being added to, the added portion may not be encrypted in accordance with the remaining portion of the encrypted file. It may be desirable to provide a method and/or system to provide functionality including determining whether data intended to be encrypted is encrypted, for example.

Without loss of generality, encryption refers to a process or combination of processes in which data is coded so that the content of the data is not capable of being employed or understood by a person or a device without first being decoded back to the previous form or format it had prior to being encrypted. It is noted that in this context, the term encryption includes re-encryption. Thus, decryption, in this context, refers to a process of decoding encrypted data back to the form or format it had prior to encryption. Additionally, it may be worthwhile to note that in at least one embodiment, data may be encrypted in an order capable of being defined or characterized deterministically. In this context, defined or characterized deterministically means in a manner that is not arbitrary. Examples, without loss of generality include an order that is sequential or lexicographical, although a virtually limitless set of other orders are possible to define or characterize that are not arbitrary. Other examples, again without loss of generality may comprise an order based at least in part on any combination, subcombination, or subset of the following parameters: logical block number (if a block of data is involved); sector or partition of a disk or other region of memory; region of a database; date of creation of a segment of data or some other subportion of data; by directory; file name; file size; file content; and/or by one or more other criteria. For convenience, in this context, with respect to describing particular embodiments, one or more portions or subportions of data may be referred to as one or more segments. A segment of data, in this context, therefore, may comprise, without limitation, a contiguous or non-contiguous portion or subportion of data. Examples include, without limitation, a portion or subportion of a block of data, a data file, a data fragment, a sector of data, and the like. Additionally, an encryption process may follow a pattern, such as by encrypting data file by data file, sector by sector and/or block by block, for example. Of course, this is merely one example implementation and may other implementations within the scope of claimed subject matter are possible. However, such a pattern may depend at least in part on a variety of different factors, one such factor comprising, without loss of generality, how data may be stored.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, and/or word processor program, that are accessible through a network browser, electronic mail, interactive games, video and/or image processing programs, calendars, financial application software, inventory control systems and/or the like. However, these are merely examples of an application and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual in an organization and/or enterprise that is capable of interacting with applications hosted by information services, enabled with one or more computing platforms for example, provided to individuals in the organization and/or enterprise. In an alternative embodiment, a user may comprise a system, computing platform, application and/or other type of entity capable of interacting with such applications. In another embodiment, a user may comprise an individual and/or entity having administrative rights and/or extra permissions to manage multi-user computing environments. Such users may be referred to as administrators. However, these are merely examples of a user and claimed subject matter is not limited in this respect.

"Stored data" as referred to herein relates to information stored in a storage medium in some retrievable format. In a particular example, a "data storage system" may maintain stored data on one or more storage mediums such as, as identified above, magnetic disk, magnetic tape, and/or semiconductor devices in a format that is retrievable in response to requests and/or commands. In one particular embodiment, a data storage system and/or device may define a file structure that identifies one or more portions of stored data by a file name according to a file and/or directory structure. Alternatively, a data storage system may define a data block structure that associates stored data with one or more locations on a storage medium. However, these are merely examples of how a data storage system may maintain stored data in a retrievable format and claimed subject matter is not limited in this respect.

FIG. 1 is a schematic diagram illustrating an embodiment 100 of a typical architecture in which an embodiment of a technique to encrypt data is employed, although claimed subject matter is not limited in scope to this particular architecture or embodiment. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, second layer 120 may supplement and/or enhance services that may be available from third layer 130. One service that might be provided by second layer 120 includes security. For example, this may include firewall functionality, such as packet filtering, packet inspection (e.g., stateful and/or stateless), packet format validation, terminating IPSec connections, and/or the like. Another service that might be provided includes data encryption and/or decryption.

Thus, in this particular example, if first layer 110 requests that data be written, second layer 120 may encrypt the data to be written. The data, once encrypted, may be stored by or at a third layer, such as 130. This is illustrated in FIG. 1 by 121. Likewise, second layer 120 may, upon another request for services by first layer 110, such as a read request, retrieve the stored, encrypted data from layer three, decrypt it, and provide it to first layer 110. One potential advantage of an embodiment, such as previously described, is that encryption and/or decryption of the data may be made transparent to third layer 130, although it is not necessary that this be the case, even for this embodiment and, thus, claimed subject matter is not limited in scope to embodiments where this is so. Likewise, although claimed subject matter is not limited in scope in this respect, encryption may be also made transparent to first layer 110, e.g., a "consumer" of the services. Likewise, in another embodiment, any two layers, such as first layer 110 and third layer 130, may reside on the same computing platform and even comprise the same layer in some embodiments, although claimed subject matter is not limited in scope in this respect, of course. Also, in other embodiments, any of first layer 110, second layer 120 and/or third layer 130 may reside on multiple computing platforms.

Nonetheless, for such an embodiment, encryption and/or decryption of data stored at or on third layer 130 may not impact operation of layer 130. In this example embodiment, layer 130 may treat data substantially the same regardless of whether or not the data is encrypted. This may provide some benefits, such as making interoperability with other systems possible. Of course, this is just one example of an embodiment of a technique for managing retention and/or discarding of stored data and, as previously stated, claimed subject matter is not limited in scope to such an embodiment.

Depending at least in part on the situation and/or the system architecture, for example, data may be encrypted for a variety of reasons. For example, data may be encrypted, at least in part, by utilizing an encryption key or set of keys. An encryption key, in this context, may comprise a portion of data that may include one or more values, such as alphanumeric values, but may typically be in the form of bits or bytes of data that may be utilized to perform encryption and/or decryption, for example. Encryption keys may be changed after a period of time and/or on the occurrence of an event. As one example, without limiting the scope of claimed subject matter, a key may change upon meeting selected expiration criteria associated with a particular key. In this example, the encrypted data may also be re-encrypted by use of another key. This process may be referred to as rekeying, and in this context, rekeying refers to a process or group of processes wherein data that may be encrypted by use of one or more keys may be re-encrypted by utilizing one or more other keys, such as a differing key or set of keys. However, it is worthwhile to note that claimed subject matter is not so limited, and re-encryption may, in some potential implementations, be performed without necessarily performing rekeying.

As previously described, access to data may be restricted during an encryption process. For example, requests to read from and/or write to data may be denied while the data is being encrypted. Access to data may be denied, for example, to allow a device performing encryption full access to the data. Additionally, as described previously, if the capability to read and/or write data is provided during an encryption process, it may be difficult to ensure that all the data that is intended to be encrypted is actually encrypted. It may be desirable to employ an approach or technique that may limit access to portions of data but not limit access to other portions of data during and encryption process. For example, without limiting the scope of claimed subject matter, it may be desirable to lock particular portions of data, such that the locked data may not be accessible while the locked portions of data are being encrypted. This may facilitate encryption of the locked portions of data, may provide the capability to access portions of data that may not be locked, and/or may reduce the amount of time that data may not be accessible, for example.

In at least one embodiment of managing the encryption of data, at some point prior, during and/or after initiating an encryption process, access to a portion of data may be altered. Altering the access may comprise decreasing the number of users who may access the data, the quantity and/or amount of data that may be accessed, for example. Limiting the access may comprise controlling the ability to read and/or write data, such as by suspending the ability to read from and/or write to segments of data by "locking" one or more segments of data, and/or may comprise altering access such that data may be read and not written, such that the data may be "read only", for example. One or more segments of data may be locked by limiting access to the locked segments during a period of time, which may be referred to as a "locking period", for example. In at least one embodiment, access may be denied to one or more segments of data while the segments of data are locked. Requests to access locked data may be denied, or alternatively may be queued to be serviced later, such as after the segment of data is encrypted. The locked segments of data may be encrypted during the locking period, for example, and this may provide the capability of the system performing the encryption to have full or partial access to the locked segments. In at least one embodiment, a "rolling lock" may be applied to data during an encryption and/or re-encryption process, wherein one or more segments of data may be locked and subsequently encrypted, and, after encryption the one or more segments may be released from a lock. The process may be repeated for additional data segments, such as by traversing, or "rolling" through a grouping of data segments that may be designated for encryption. For example, segments of data may be locked, encrypted, and released from lock, and this process may be substantially repeated until all data designated to be encrypted is successfully encrypted. This may provide the capability of a device to provide partial access to data being encrypted by limiting access a portion at a time, rather than by denying all access to data, for example.

As is well-known, there are a variety of file types and/or structures currently in use for storing data. As just one example, a Network File System (NFS) may be utilized to store data. However, a storage area network (SAN) may be utilized to store data by use of a block based protocol, such as an iSCSI (Internet Small Computer System Interface) protocol, for example. In contrast, Network Attached Storage (NAS) may store data by use of a file based protocol, for example. However, it is worthwhile to note that the claimed subject matter is not limited to any particular data structure and/or data storage device or technique either now known or to be later developed. It is intended that claimed subject matter cover all such types, structures and/or conventions that may exist now or in the future. For example, any block-based, file based, or content-addressable storage technique may be utilized, including NAS, SAN, storage array(s), file server(s) and/or data filer(s), for example. As suggested previously, for convenience, but without intending the limit the scope of claimed subject matter, throughout the remainder of this specification, a particular portion or subportion of data, regardless of the particular form or size of the portion or subportion employed, for example, may be referred to as a data segment or segment.

In one particular embodiment, although claimed subject matter is not limited in scope in this respect, locking may be applied as follows: an encryption process may be initiated for a plurality of segments of data. A portion of the segments of data may be locked, as described previously. The locked portion may be encrypted. If requests to access the locked portion are received during the locking period, the requests may be denied. Alternatively, the requests may be postponed, and/or may be queued and service later. After the portion is encrypted, the portion may be unlocked. The process of locking, encrypting, and unlocking may be repeated for one or more additional portions of the plurality of segments of data.

Figure 2:
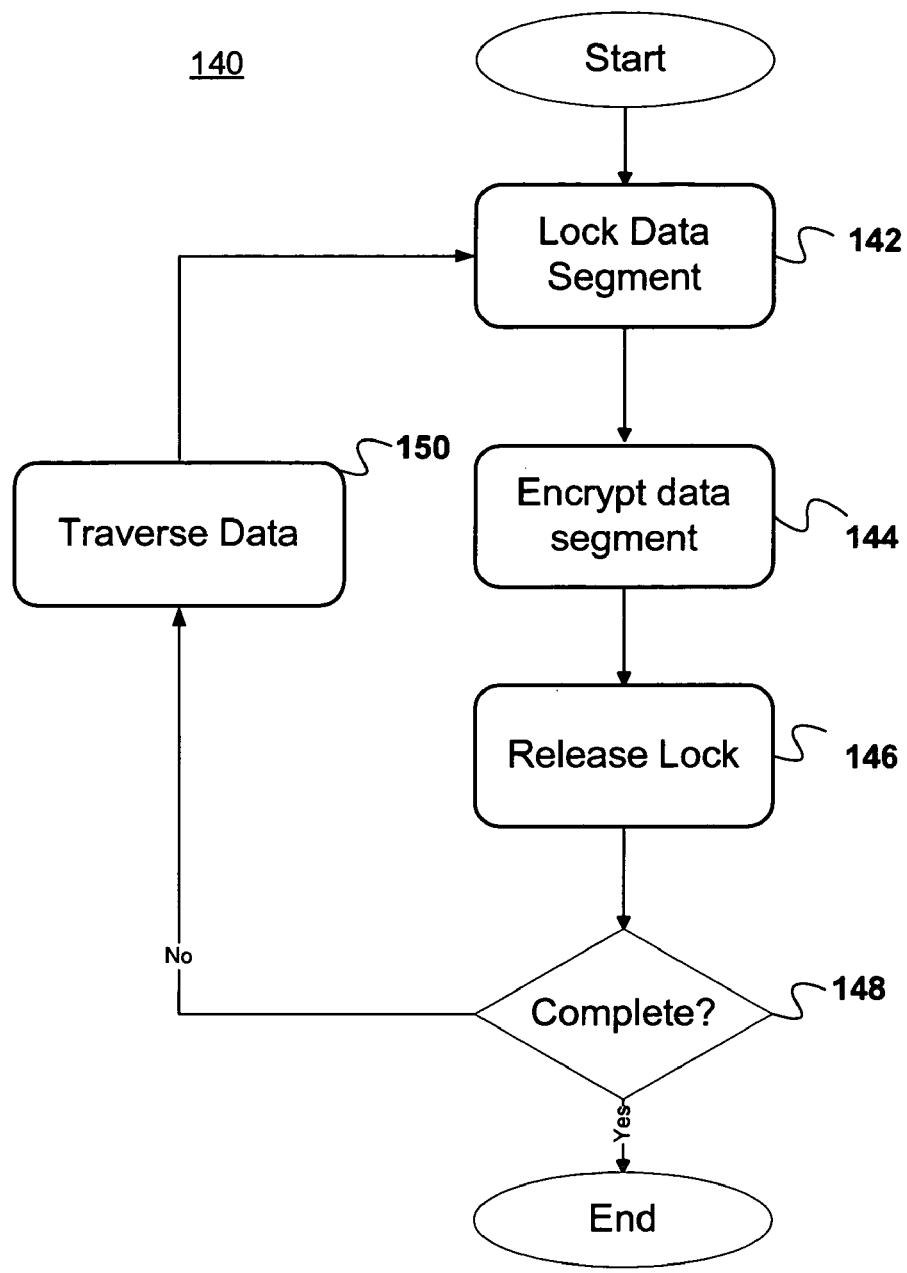
FIG. 2 is a flow diagram illustrating an embodiment of a method to manage the encryption of data.

FIG. 2 is a flow diagram, according to one embodiment, of a process 140 of managing the encryption of data. However, for flow diagrams presented herein, the order in which the blocks are presented does not necessarily limit claimed subject matter to any particular order. Additionally, intervening blocks not shown may be employed without departing from the scope of claimed subject matter. Flow diagrams depicted herein may, in alternative embodiments, be implemented in a combination of hardware, software and/or firmware, such as part of a computer system. The functionality of flow diagram 140 may be executed manually, such as by a user, and/or may be executed by a software application such as a data storage device and/or storage security appliance, for example.

At block 142, a segment of data may be locked. The segment of data may comprise one or more portions of one or more blocks, sectors or files of data and/or one or more portions of one or more blocks, sectors or files, as explained previously, for example. The segment of data may comprise a subset of a set of data that may be selected for encryption. Locking the subset of data may comprise altering access to the data, such as by preventing reading from and/or writing to the data, as explained previously. At block 144, at least a portion of the locked data may be encrypted. The data may be encrypted by use of one or more keys, and in at least one embodiment, if the data was previously encrypted, a differing key or keys may be utilized for re-encrypting, such as to rekey the data, as explained previously. However, the particular manner of encrypting, re-encrypting and/or rekeying is not limited, and the claimed subject matter does not depend on the use of any particular manner of encrypting, re-encrypting and/or rekeying data.

During the encryption process, requests to access data may be received. If the request comprises a request to access data that is locked, the request may be denied, and/or the request may be partially filled, such as by providing read access to the data, and the particular access provided may depend at least in part on the manner by which access may have been altered at block 142. Alternatively, the request may be queued, and may be serviced later, such as after the data is encrypted. Additionally, in an alternative embodiment, prior to locking a segment of data, a determination may be made whether the data is currently being accessed, and/or if a request has been made to access the data. If the data is being accessed and/or a request has been made to access the data, the locking of block 142 may be postponed until the data has been accessed and is no longer being accessed, for example. In this example, other portions of data may be locked instead of the segment being accessed, and the segment being accessed may be queued to be encrypted later, for example.

At block 146, after encryption, the locked and encrypted segment of data may be released from lock. This may comprise, for example, undoing the previously imposed alteration to access the data implemented at block 142. In this context, although the claimed subject matter is not so limited, undoing an alteration may comprise reversing an alteration such that an alteration is effectively annulled or cancelled, and/or may comprise altering from a second state back to a first state, or may comprise altering from a second state to a third state that may vary from the first state. The third state may comprise a state similar to the first and/or second state, and may be an intermediate state between the first and second state, for example. At block 148, a determination may be made whether the encryption process is complete, such as if the encryption process has a point of completion. A point of completion may comprise the point where all the data to be encrypted has been encrypted, for example. If the encryption process has been completed, the functionality of process 140 may be stopped. However, if the encryption process is not completed, data, such as the above-described identified set of data may be traversed at block 150 to a segment of data that has not been encrypted at block 144. This process may be substantially repeated for one or more portions of data, such as until a substantial portion of the data designated for encryption is encrypted, for example.

As alluded to previously, it may be desirable to ensure that all data designated to be encrypted is actually encrypted. In at least one embodiment, data may be traversed in some order to increase the likelihood all data selected to be encrypted is encrypted. Traversing data may be performed in a variety of ways. Without limitation, data may be traversed, for example, by logical block number if the data comprises blocks, by file name, number, size, time of creation or one or more other ways such as lexicographically and/or sequentially by one or more measurable values, such as described previously. Additionally, data may be arranged and/or organized by a hierarchical structure that may be referred to as a tree. The tree may comprise segments of data that may be arranged in some manner, such as by organizing multiple segments of data on "branches", wherein the branches may have "leaves", which may comprise segments of data, for example. The tree may be traversed in a logical order, such as branch by branch and/or leaf by leaf, such that a substantial portion of the data may be traversed, for example. In one embodiment, data may reside at least partially in files, and the files may have a file structure, such as multiple directories. Data may be traversed by directory of files, and the directories may be traversed sequentially and depth-wise until a substantial portion of the files are traversed. However, it is worthwhile to note that the claimed subject matter is not limited with respect to data traversal and any method or technique for traversing data may be employed and not depart from the scope of the claimed subject matter.

Additionally, one technique that may be employed to confirm and/or increase the likelihood that data selected to be encrypted is successfully encrypted comprises determining the status of one or more portions of data that have been selected for encryption. Status may be determined at some point before, during and/or after the encryption process has been initiated and/or completed. In one embodiment, status of one or more segments of data may be determined, and the status may be utilized to determine whether the segments of data have been encrypted. The status may be determined by accessing one or more portions of data, and/or may be obtained by accessing a list that may be maintained for one or more data segments. As part of the encryption process, status may be determined for one or more segments of data, and the encryption process may proceed and/or may end based at least in part on the determined status.

Determining status may be performed in a variety of ways, and the claimed subject matter is not limited in this manner. However, in one embodiment, a list may be maintained that may include status data for one or more segments of data, such as access time/date, whether the segment of data is encrypted, when encrypted, which key was used to encrypt, last access time and/or last save time of the segment, for example. A list may comprise a listing of segments of data stored on a data storage device and/or a listing of data segments selected for encryption, for example. A list may include data relating to the data segments, such as number of segments, location, content, and/or size, for example, and additionally may be updated during an encryption process to include updated status data. A list may be generated in conjunction with a selected of a set of data for encryption and/or may be generated upon the initiation of a data storage device, for example.

A list such as describe above may comprise an electronic file accessible by one or more devices such as represented by layers 1, 2 and/or 3 of FIG. 2, for example. In one embodiment, after a portion of selected data is encrypted, the list may be accessed to determine if data of the selected set has all been encrypted, and if a portion, such as a subset, of the set has not been encrypted, one or more portions of the encryption process may be repeated, such as for portions of data that have not be encrypted and/or for the entire designated set of data, for example. Alternatively, determining whether data has been encrypted may be performed by accessing data that may be associated with the data, such as data that may identify the last time the data was accessed, when the data was last encrypted and/or identification data that may indicate a particular key or set of keys that may have been utilized to encrypt the data, and this data may not be embodied in a list, for example, but may be attainable by accessing a segment of data or one or more other portions of data that may provide status for one or more segments of data.

In one particular embodiment, although claimed subject matter is not limited in scope in this respect, determining status during an encryption process by accessing a list may be applied as follows: an encryption process may be initiated for a plurality of segments of data. A list may be generated for the plurality of segments of data, and may include information as described previously. The encryption process may be applied to the segments of data. A list may be accessed to determine if any portions of data were not encrypted. If portions of data were not encrypted, the portions of data may be encrypted. Alternatively, if portions of data were not encrypted, the entire encryption process may be restarted. This process may be repeated until the list is accessed and a determination is made that all the data has been encrypted.

Figure 3:
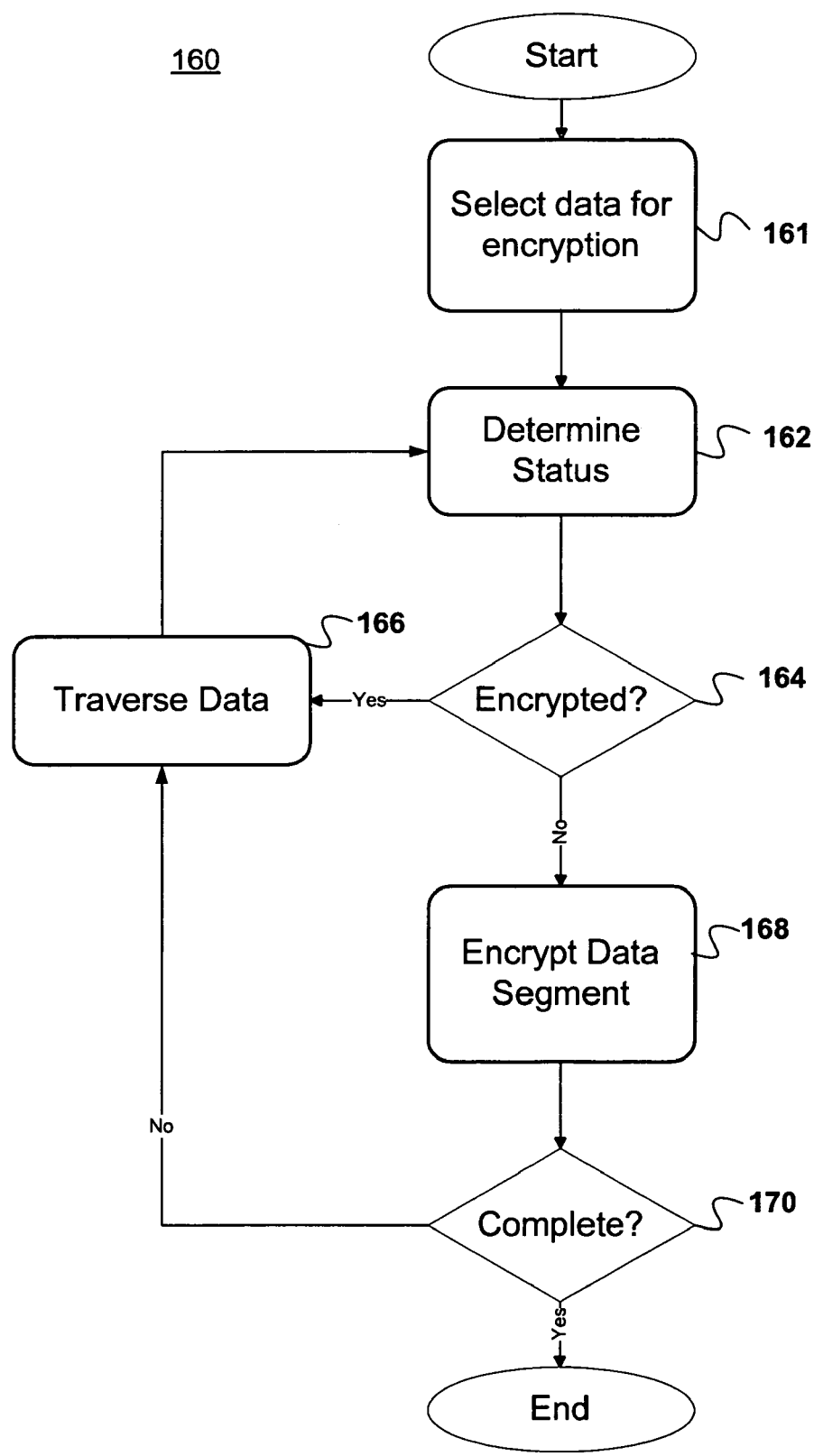
FIG. 3 is a flow diagram illustrating an embodiment of a method to manage the encryption of data.

Referring now to FIG. 3, there is illustrated a flow diagram, according to one embodiment, of a process 160 for managing the encryption of data. At block 161, a set of data may be selected for encryption. The set of data may comprise at least a portion of data stored on a data storage device, for example, and may comprise one or more segments of data. The data may be selected for re-encryption, for example, and the re-encryption may comprise part of a rekeying process, as described previously. The set of data may be selected for encryption by a user, and/or may be selected in response to the occurrence of an event, such as the expiration of a key or set of keys as explained previously. The set of data may comprise one or more portions of one or more blocks, sectors and/or data files, as explained previously. At block 162, status of at least a portion of the selected data may be determined. The status of the segment of data may be determined by accessing the data segment and/or a list that may include status of the data segments. A list may include one or more portions of data that may relate to the selected data, such as: access time/date, whether the segment of data is encrypted, when encrypted, which key was used to encrypt, last access time and/or last save time, for example. The status may be utilized to determine whether the accessed segment of data has already been encrypted in accordance with the selecting from block 161.

At block 164, a determination may be made of whether the one or more portions of data has been encrypted. The determination may be made, based at least in part, on the determined status from block 162. If the data has already been encrypted, at block 166 the set of data designated for encryption may be traversed in one or more ways to identify another segment of data, and the process may be initiated at block 162 for the other segment of data. However, if the accessed data segment has not been encrypted in accordance with the selection, at block 168 the data may be encrypted. After encryption, the list may be updated to indicate that the data was encrypted, for example.

At block 170, a determination may be made if all the data of the set designated at block 161 has been successfully encrypted. This may be performed at least in part by accessing the list, and determining status for one or more data segments, for example. If all of the data of the designated set has been successfully encrypted, the process may end, for example. Conversely, if not all the data designated for encryption has been successfully encrypted, the functionality of block 166 may be initiated and one or more portions of block diagram 160 may be repeated. Alternatively, rather than determining if all the data of the designated set has been successfully encrypted, the list may be accessed to determine whether any access to the selected data was granted during the encryption process. For example, if access was provided to one or more portions of the data of a designated set, the designated set of data may be traversed and encrypted a subsequent time. This process may be repeated a particular number of times and/or until the process may be completed before any portions of the designated data have been accessed or not accessed.

In one alternative embodiment, an encryption process may be implemented. The encryption process may utilize a particular data traversal technique, such as a directory by directory approach. A list may be maintained, and may include information including whether portions of data have been encrypted and/or when portions of data have been accessed. The list may periodically be accessed to determine if portions of data have not been encrypted. For example, an encryption process may encrypt a directory of segments of data. After the segments of data in the directory are encrypted, a list may be accessed to determine if any segments of data in the directory were accessed after and/or during the encryption process. If portions of data have been accessed after and/or during the encryption process, the portions of data may be queued for encryption. The encryption process may proceed until the point of completion of the encryption process, and, after completion the queued portions of data may be encrypted. In one alternative, if portions of data are in the queue, the entire encryption process may be repeated, such as if the queue includes a substantial portion of the data that was initially selected to be encrypted, for example.

Figure 4:
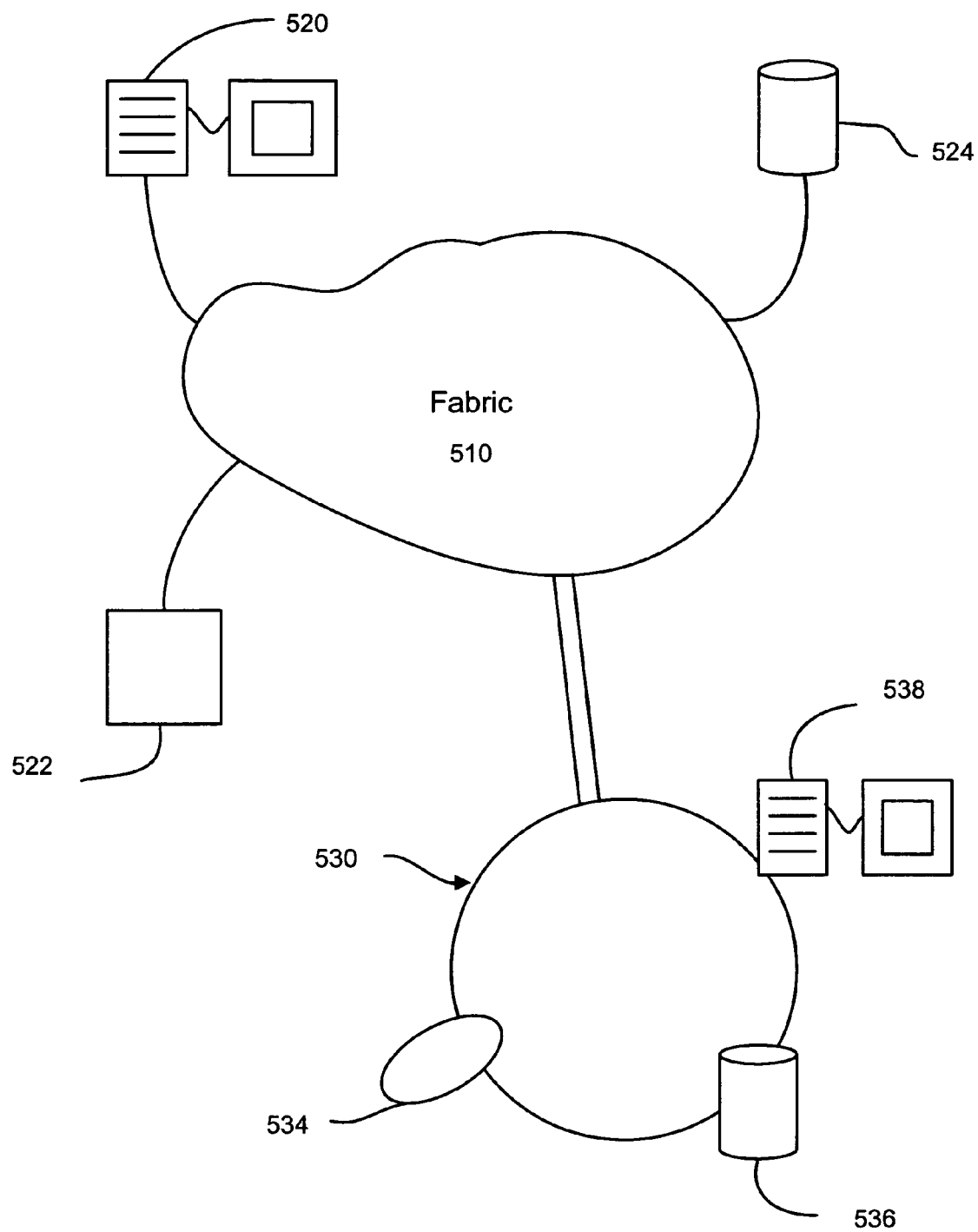
FIG. 4 is a schematic diagram illustrating an embodiment of a system that may be implemented to manage the encryption of data.

FIG. 4 is a schematic diagram of an example embodiment of a communications network or system 500 that may employ an embodiment in accordance with claimed subject matter. In this example, embodiment 500 comprises a switched fabric 510 and a plurality of devices, such as 520, 522, 524, and/or groups of devices, such as 534, 536, and 538, as indicated with respect to logical loop 530, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 510, may be communicatively coupled to various devices, such as, here, 520, 522, and 524, and may operate as a switching network to allow these devices to communicate with each other. Devices 520, 522, and 524 may comprise any type of device, such as, for example, a computing platform, a storage device, and/or the like, and may be communicatively coupled via fabric 510 by employing point-to-point communications technology or techniques, as one example. In this particular embodiment, fabric 510 comprises a variety of communicatively coupled switches. In this particular embodiment fabric 510 is also in communication with logical loop 530. Loop 530 here includes devices 534, 536 and 538. In this particular embodiment, loop 530 comprises an arbitrated loop with ring couplings for providing multiple nodes with the ability to arbitrate access to shared bandwidth. It is, of course, appreciated that this particular embodiment is merely an illustrative example and claimed subject matter is not limited in scope in any way to this particular embodiment.

The following discussion details several possible embodiments for accomplishing this, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method for managing encryption of data in a computer, the method comprising:
   selecting a plurality of segments of data for encryption;
   locking a portion of the plurality of segments of data, wherein in response to receipt of a data access request directed to at least one segment of the plurality of segments of data, denying access to only the portion of plurality of segments of data that is locked;
   performing one or more encryption operations on only the locked portion of the plurality of segments of data selected for encryption;
   in response to completion of the one or more encryption operations, unlocking the locked portion of the plurality of segments of data; and
   repeating the steps of locking, performing, and unlocking, on another portion of the plurality of the segments of data selected for encryption until all of the plurality of segments of data have been encrypted.

2. The method of claim 1 wherein locking only a portion of the plurality of segments of data selected for encryption reduces amount of time that each segment of data of the plurality of segments of data selected for encryption is unavailable for access by a user.

3. The method of claim 1, wherein said selecting a set of data comprises generating a list of data, wherein the data included on the list is selected for encryption, and wherein the list includes status of the data.

4. The method of claim 1, wherein the operation to the data access request comprises queuing the data access request until the locked segment of the set of data is unlocked.

5. The method of claim 1, wherein said one or more encryption operations comprises one or more rekeying operations.

6. An article comprising: a storage medium having stored thereon instructions that, if executed, result in:
   selecting plurality of segments of data for encryption;
   locking a portion of the plurality of segments of data, wherein in response to receipt of a data access request directed to at least one segment of the plurality of segments of data, denying access to only the portion of plurality of segments of data that is locked;
   performing one or more encryption operations on only the locked portion of the plurality of segments of data selected for encryption;
   in response to completion of the one or more encryption operations, unlocking the locked portion of the plurality of segments of data; and
   repeating the steps of locking, performing, and unlocking, on another portion of the plurality of the segments of data selected for encryption until all of the plurality of segments of data have been encrypted.

7. The article of claim 6, wherein said storage medium further includes instructions that, if executed, further result in: locking only a portion of the plurality of segments of data selected for encryption reduces the amount of time that each segment of data of the plurality of segments of data selected for encryption is unavailable for access by a user.

8. The article of claim 6, wherein said storage medium further includes instructions that, if executed, further result in: said selecting a set of data comprising generating a list of data, wherein the data included on the list is selected for encryption; wherein the list includes status of the data.

9. The article of claim 6, wherein said storage medium further includes instructions that, if executed, further result in: said one or more encryption operations comprising one or more rekeying operations.

10. The method of claim 1, wherein the segments of data are one or more portions of one or more data blocks.

11. The method of claim 1, wherein locking a portion of data comprises altering access to the data by preventing only writing of the locked data.

12. The method of claim 11, wherein the denied request to access the locked portion of data is partially filled by providing only read access to the locked portion of the data.

13. The method of claim 1, wherein locking a portion of data comprises altering access to the data by preventing reading and writing of the locked data.

14. The method of claim 1, further comprising postponing the locking of the portion of the plurality of segments selected for encryption if a request to access the portion is received prior to locking the portion of the plurality of segments of data.

15. The article of claim 6, wherein the segments of data are one or more portions of one or more data blocks.

16. The article of claim 6, wherein locking a portion of data comprises altering access to the data by preventing only writing of the locked data.

17. The article of claim 16, wherein the denied request to access the locked portion of data is partially filled by providing only read access to the locked portion of the data.

18. The article of claim 6, wherein locking a portion of data comprises altering access to the data by preventing reading and writing of the locked data.

19. The article of claim 6, wherein said storage medium further includes instructions that, if executed, further result in: postponing the locking of the portion of the plurality of segments selected for encryption if a request to access the portion is received prior to locking the portion of the plurality of segments of data.

20. A system comprising:
a security appliance configured to perform one or more operations executed by a processor, the processor configure to,
select a plurality of segments of data for encryption,
lock a portion of the plurality of segments of data, wherein in response to receipt of a data access request directed to at least one segment of the plurality of segments of data, denying access to only the portion of plurality of segments of data that is locked,
perform one or more encryption operations on only the locked portion of the plurality of segments of data selected for encryption,
unlock the locked portion of the plurality of segments of data in response to completion of the one or more encryption operations, and
repeat locking, performing and unlocking, on another portion of the plurality of the segments of data selected for encryption until all of the plurality of segments of data have been encrypted.

* * * * *